Aug. 25, 1931.  H. T. HERR  1,820,740
REDUCTION GEAR WITH DYNAMOMETER
Filed April 30, 1930   2 Sheets-Sheet 1
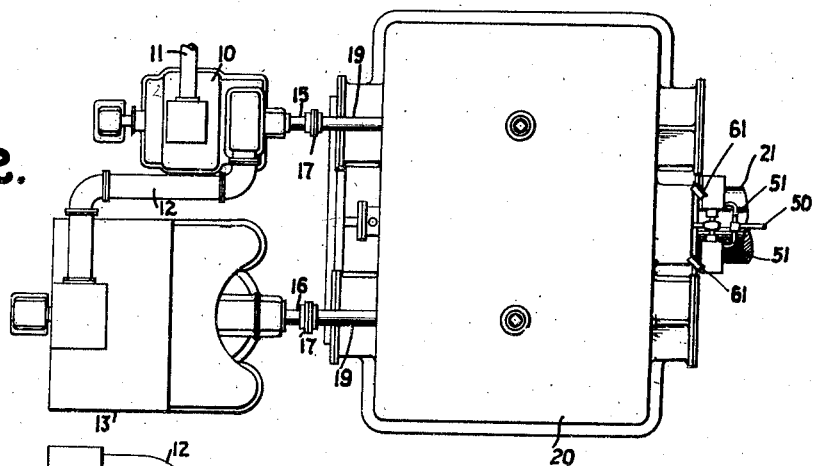
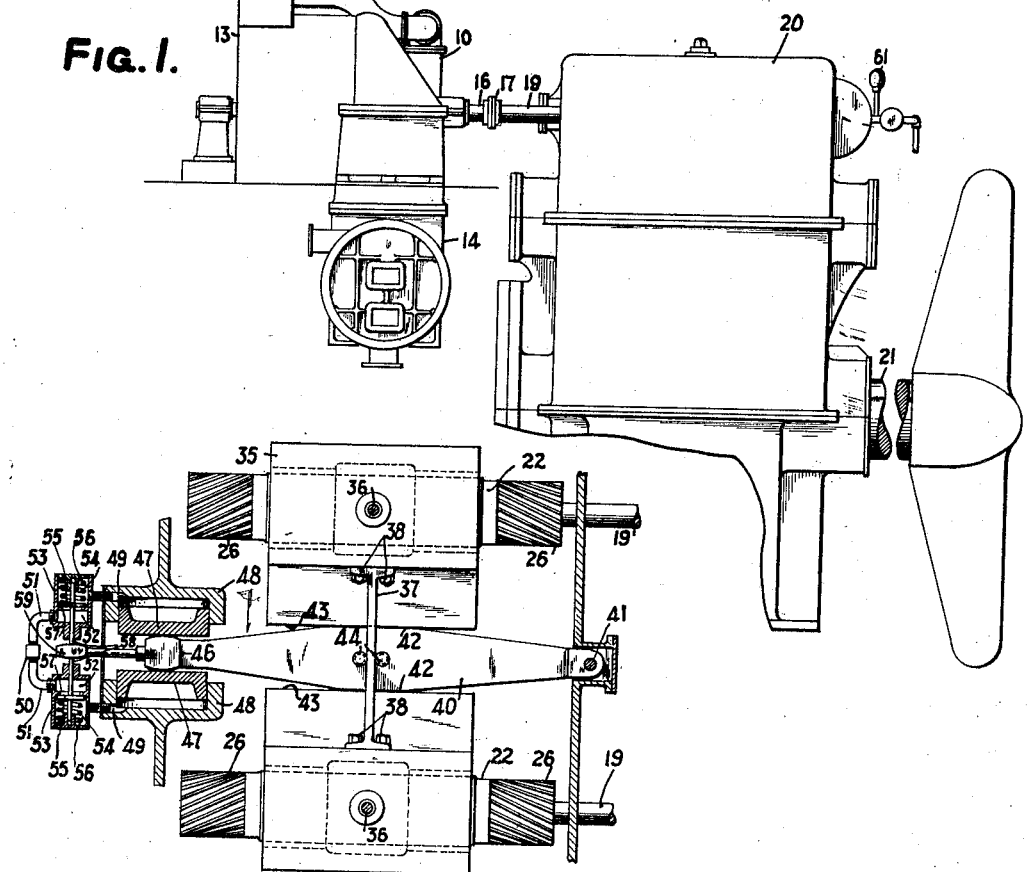
WITNESSES:
INVENTOR
Herbert T. Herr.
BY
ATTORNEY Aug. 25, 1931. H. T. HERR 1,820,740
REDUCTION GEAR WITH DYNAMOMETER
Filed April 30, 1930 2 Sheets-Sheet 2

WITNESSES:

INVENTOR
Herbert T. Herr.
BY
ATTORNEY

Patented Aug. 25, 1931

1,820,740

UNITED STATES PATENT OFFICE

HERBERT T. HERR, OF PHILADELPHIA, PENNSYLVANIA, ASSIGNOR TO WESTINGHOUSE ELECTRIC & MANUFACTURING COMPANY, A CORPORATION OF PENNSYLVANIA

REDUCTION GEAR WITH DYNAMOMETER

Application filed April 30, 1930. Serial No. 448,746.

My invention relates to reduction gearing of the marine propulsion type, and it has for an object to provide an improved reduction gear set for a plurality of prime movers with the gearing so constructed and arranged that requirements for space are minimized.

Where reduction gearing is used for the transmission of power from a cross-compound marine turbine to a propeller shaft, particularly if double reduction gearing is used, the gearing itself ordinarily occupies a considerable amount of space. In accordance with my invention, I provide a reduction gear set suitable for use with a cross-compound turbine element with the driving pinions of the gear set arranged at the top so that the condenser for the low-pressure turbine element may be arranged below the latter. Hence, a further object of my invention is to provide reduction gearing with the driving pinions at the top of the gear set in order that the prime movers may be so arranged that the condensing apparatus may be disposed below the low-pressure prime mover.

A further object of my invention is to provide a driving pinion for reduction gearing wherein the pinion is arranged at the top of the gearing and is carried by a floating frame capable of tilting in substantially a horizontal plane to effect balancing of tooth pressures.

A further object of my invention is to provide a reduction gear having a pair of driving pinions arranged for connection to high and low-pressure prime movers, the pinions being carried by floating frames connected by flexible means and restrained from movement in the plane of the pinion axes.

A further object of my invention is to provide a reduction gear having a pair of driving pinions carried by suitable floating frame structure and provided with improved dynamometer means for the purpose of measuring power delivered.

These and other objects are effected by my invention, as will be apparent from the following description and claims taken in connection with the accompanying drawings, forming a part of this application, in which Figure 1 is a view, in side elevation, showing my improved marine power plant installation;

Figure 2 is a plan view of the apparatus shown in Figure 1;

Figure 5 is a plan view showing details of the floating frame structure.

Figures 3, 4:
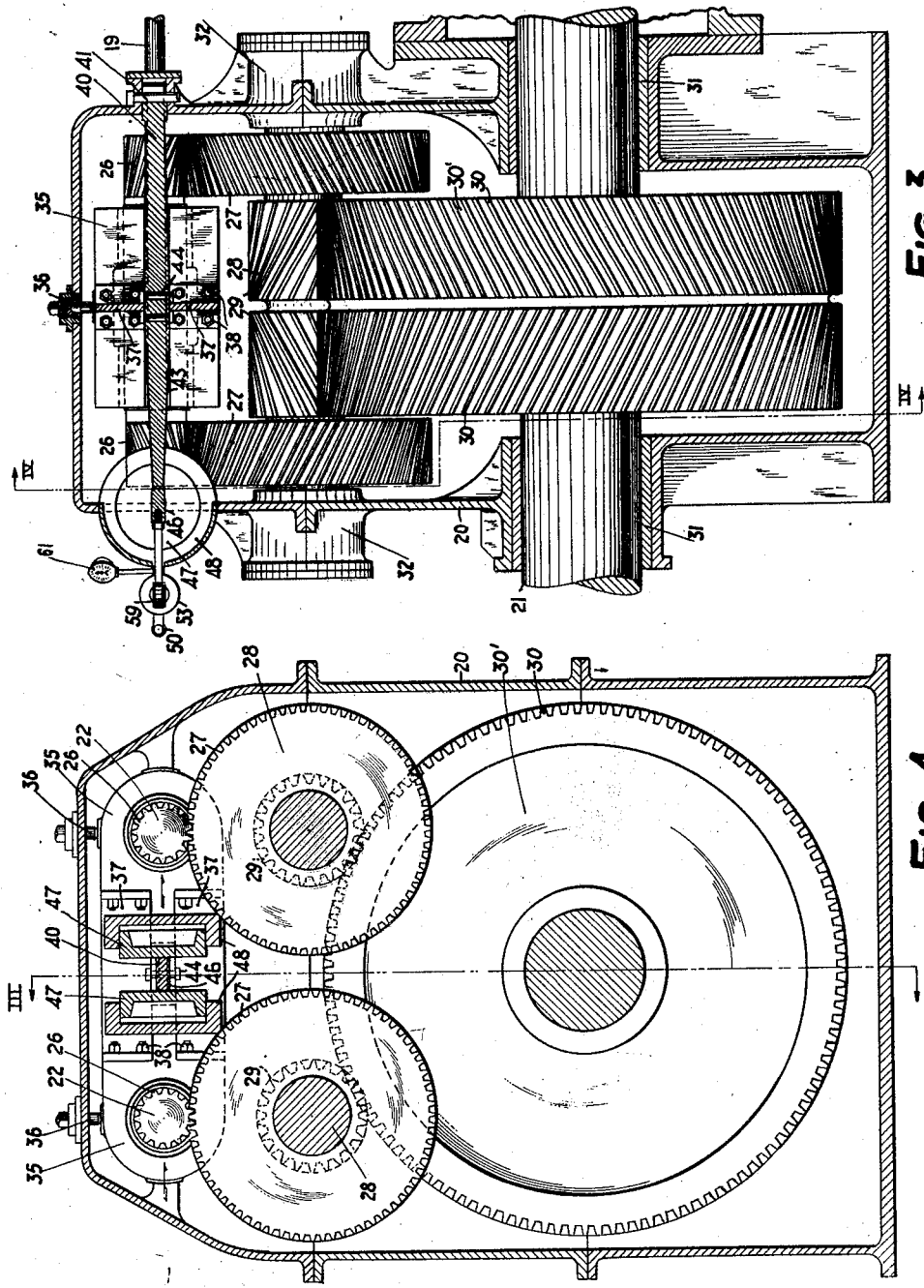
Figure 3 is a sectional view taken along the line III—III of Figure 4, but showing the gears and pinions in elevation.
Figure 4 is a longitudinal sectional view taken along the line IV—IV of Figure 3.

Referring to the drawings more in detail, in Figures 1 and 2, I show cross-compound turbines including a high-pressure turbine 10 having a steam inlet 11 and a cross connection 12 leading to the low-pressure turbine 13, the latter exhausting to a suitable condenser 14.

The turbines 10 and 13 have their shafts 15 and 16 connected by couplings 17, 17 to pinion shafts 19, 19, the latter extending into the gear housing 20 enclosing my improved reduction gear, which drives the propeller shaft 21.

The reduction gearing includes a pair of driving pinions 22, 22 connected to the shafts 19, 19, respectively, the pinions having toothed portions 26, 26 meshing with gear tooth portions 27, 27 of intermediate gear elements 28, the latter having pinion portions 29, 29 meshing with teeth 30, 30 of the driven gear 30'.

The gear casing 20 is provided with bearings 31, 31 for the driven or propeller shaft 21, which supports the driven gear 30. Above the axis of the driven gear 30, the casing 21 is provided with bearings 32, 32 for the intermediate gear elements 28, these bearings being preferably placed at a sufficient distance above the bearings 31 that the pinion portions 29, 29 of the intermediate gear elements mesh with the upper portion of the driven gear 30, as shown in Figures 3 and 4. The driving pinions 22, 22 are arranged above the intermediate gear elements 28, 28 so that the pinion portions 26, 26 mesh at the top of the intermediate gear portions 27, 27. With this arrangement of gearing, not only is the double-reduction gear quite compact, but, as the driving pinions 22, 22 are at the top of the gearing, the power plant apparatus including the turbine elements and the condenser may be installed in such a manner as to minimize the requirements for space, the principal feature in this connection being the location of the condenser beneath the high-pressure turbine, this being permitted due to the elevation of the pinion driving shafts 19, 19.

The driving pinions 22, 22 are carried by improved floating frame structures. Referring to Figures 4 and 5, I show the driving pinion elements 22, 22 carried by frame members 35, 35, suitable struts 36, 36 cooperating with the frames to maintain the tooth portions 26, 26 in proper meshing relation.

The frames 35, 35 are connected by suitable flexible means to premit of the frames tilting in a plane or planes substantially normal to the planes of centers of the respective driving pinion and intermediate gear members in order to secure balancing of tooth pressures. Preferably, the frames are connected by flexible metallic elements 37, 37 of I-form in cross section, these elements being shown as secured to the frames by bolts 38, 38.

The connected frame structure must be restrained from translatory movement. To this end, I show a member 40 arranged between the frames 35, 35 and abutting therewith. Preferably, the restraining member 40 takes the form of a lever fulcrumed at one end at 41 and having curved lateral abutment portions 42, 42 engaging with the abutments 43, 43 provided on the frames 35, 35 and extending toward each other. Also, I prefer to have two flexible members 37, one above and one below the lever 40.

To prevent lateral displacement of the floating frames 35, 35 and the driving pinions 22, 22 carried thereby, the lever member 40 is preferably provided with pins 44, 44 disposed on either side of the webs of the flexible connecting members 37.

The end of the lever 40 opposite to the fulcrum or pivot 41 is restrained in order to limit horizontal translatory movement of the frame and pinions. Referring to Figures 4 and 5 and assuming that the driving pinions 22, 22 are rotated counterclockwise, it will be apparent that, unless restrained, the driving pinion and floating frame structure would tend to be translated toward the left, referring to the upper portion of Figure 4, or the structure in Figure 5 would tend to be translated upwardly in the plane of the paper. Therefore, opposing reacting forces must be exerted in the direction of the arrows substantially to prevent this movement, and the lever 40 gives this resistance. With the pinions 22 rotating as shown, translation of the left-hand frame 35 of Figure 4 or the upper frame of Figure 5 is resisted in tension by the flexible members 37; and this tension stress is applied as compression, together with compression due to the right-hand frame of Figure 4 or the lower frame of Figure 5, to the right-hand face of the lever 40 in Figure 4 or the lower face thereof in Figure 5.

With the structure referred to, where the movable member or lever 40 serves as a reaction element substantially preventing translatory movement of the connected floating frames and pinions, if dynamometer means is associated with the movable member or lever 40, such dynamometer means may be used to indicate the power transmitted by the gearing. To this end, I show the end 46 of the lever opposite to the fulcrum of pivot 41 arranged in abutting relation with respect to pistons 47, 47 fitting cylinders 48, 48. Each of the cylinders 48, 48 is arranged to be supplied with fluid under pressure through passages 49, 49 from a suitable source. As shown in Figure 5, I provide a supply connection 50 having branches 51, 51 communicating with the chambers 52, 52 of valve housings 53, 53, the latter having chambers 54, 54 communicating with the passages 49, 49 already referred to. The chambers 52, and 53 have valves 55, 55 arranged to open in the direction of the chambers 54, 54 and to close in the direction of the chambers 52, 52, springs 56, 56 being arranged in the chambers 54, 54 to move the valves 55, 55 in a closing direction to seat against the seats 57, 57. The valves are provided with opposed stems 58, 58 passing through the chambers 52, 52 and extending outwardly of the housings 53, 53 to engage opposite sides of the extension 59 carried by the lever member 40.

Assuming in Figure 5, that there is a tendency for the pinion and frame structure to be translated upwardly, a slight or incipient movement in this direction causes the uppermost valve 55 to be unseated, whereupon fluid under pressure is supplied to the upper cylinder 48, whereby the force tending to cause movement of the frame and pinion structure is not only counteracted but such structure is brought back to normal median position, for fluid under pressure continues to be admitted to the upper cylinder until such time that the upper valve is closed and this takes place only when the lever member 40 is in its normal intermediate position.

Each of the passages 49 has associated therewith a gauge. Each passage may be provided with a gauge 61, as shown in Figures 2 and 3, or a single gauge may be associated with both passages 49. The gauge will show the intensity of pressure necessary to hold the floating frame and pinion structure in normal position and hence it is used to indicate the power transmitted by the gearing.

While one of the fluid pressure-opposing and dynamometer devices would be sufficient if the gearing was unidirectional, I have shown and described fluid pressure devices disposed on either side of the lever 40 so that fluid pressure forces may be exerted on the lever in either direction dependent upon the direction of rotation of the gearing.

From the foregoing, it will be apparent that I have provided reduction gearing having the driving pinion or pinions located at such an elevation that the condenser may be readily accommodated beneath the turbine and the latter drive the pinion directly. As the pinion or pinions are arranged at the top of the gearing, I provide improved floating frame means permitting of tilting movement in a substantially horizontal plane to secure balancing of tooth pressures. Furthermore, as I prefer to have a pair of driving pinions to transmit power from high and low-pressure turbine elements of a cross-compound installation, such pinions are carried by floating frame elements connected by flexible members, the entire structure having means associated therewith to restrict or substantially prevent translatory movement. Preferably, translatory movement of the pinion and frame structure is resisted by a lever member, one end of which is associated with dynamometer means so that the power may be measured whether the gearing is operated in one direction or the other.

While I have shown my invention in but one form, it will be obvious to those skilled in the art that it is not so limited, but is susceptible of various changes and modifications, without departing from the spirit hereof, and I desire, therefore, that only such limitations shall be placed thereupon as are imposed by the prior art or as are specifically set forth in the appended claims.

What I claim is:

1. The combination with reduction gearing including a pair of driving pinion elements, of frames for supporting the pinion elements, mechanism for restricting tangential translatory movement of the frames and pinions including tension means interposed between and connected to the frames, and means for restraining movement of the connected frame members in the common plane of the pinion element axes.

2. The combination with reduction gearing including a pair of driving pinion elements, of frames for supporting the pinion elements, flexible connecting means between the frames providing for tilting movement thereof with the pinion elements carried thereby, means for restraining movement of the frames in the common plane of the pinion element axes, and struts cooperating with the frames for maintaining the pinion elements in proper meshing relation.

3. The combination with reduction gearing including a pair of driving pinion elements, of frames for the driving pinion elements, a supporting element extending between the frames and abutting therewith, and flexible means for connecting the frames.

4. The combination with reduction gearing including a pair of driving pinion elements, of frames for the driving pinion elements, a supporting element extending between the frames and abutting therewith, flexible means for connecting the frames and providing for tilting movement thereof to balance tooth pressures, and struts cooperating with the frames to maintain the pinion elements in proper meshing relation.

5. The combination with reduction gearing including a pair of driving pinion elements, of frames for the driving pinion elements, a lever member extending between the frames and abutting therewith, and flexible elements for connecting the frames and arranged above and below the lever member.

6. The combination with reduction gearing including a pair of driving pinion elements, of frames for supporting the driving pinion elements, a lever arranged between and abutting the frames, flexible metallic connecting means between the frames, strut means cooperating with the frames to maintain the pinion elements in proper meshing relation, and means for restraining movement of the lever member.

7. The combination with reduction gearing including a pair of driving pinion elements, of frames for supporting the driving pinion elements, a lever extending between and abutting the frames, flexible metallic connecting means between the frames, pivotal supporting means for one end of the lever, and means for restraining movement of the other end of the lever including a dynamometer.

8. The combination with reduction gearing including a pair of driving pinion elements, of frames for supporting the driving pinion elements, a lever extending between and abutting the frames, flexible metallic connecting means between the frames, pivotal supporting means for one end of the lever, and means for restraining movement of the lever in either direction including a dynamometer.

9. The combination with reduction gearing including a pair of driving pinion elements, frames for supporting the pinion elements, a movable support arranged in abutting relation with respect to the frames, flexible means for connecting the frames together, and means for resisting movement of said supporting element including pressure means and means for controlling the application of pressure medium thereto in response to incipient movement of said supporting element to resist movement thereof, and to restore it to normal position, and means for indicating the applied pressure.

10. The combination with reduction gearing including a pair of driving pinion elements, of frames for supporting the driving pinion elements, a movable supporting element arranged between and abutting with the frames, means for flexibly connecting the frames together, strut means cooperating with the frames for maintaining the pinion elements in proper meshing relation, means for restraining movement of said movable supporting element in opposite directions including pressure means responsive to incipient movement of the supporting element in either direction to apply pressure medium to the supporting element to resist movement thereof, and to restore it to normal position, and means for indicating the intensity of applied pressure.

In testimony whereof, I have hereunto subscribed my name this 23rd day of April, 1930.

HERBERT T. HERR.